United States Patent [19]

Shirai

[11] 4,243,128
[45] Jan. 6, 1981

[54] ELECTROMAGNETIC CLUTCHES
[75] Inventor: Isamu Shirai, Isesaki, Japan
[73] Assignee: Sankyo Electronic Company Limited, Isesaki, Japan
[21] Appl. No.: 890,982
[22] Filed: Mar. 28, 1978
[30] Foreign Application Priority Data Mar. 30, 1977 [JP] Japan .................................. 52/36601

[51] Int. Cl.³ ............................................. F16D 27/10
[52] U.S. Cl. ...................................... 192/35; 192/79; 192/84 C; 192/84 T
[58] Field of Search .................... 192/84 T, 84 C, 35, 192/48.2, 48.3, 79, 80, 65

[56] References Cited
U.S. PATENT DOCUMENTS

| 467,686 | 1/1892 | Hinkley | 192/80 |
|---|---|---|---|
| 3,149,706 | 9/1964 | Mason et al. | 192/84 C X |
| 3,582,697 | 6/1971 | Bochan et al. | 192/84 C X |
| 3,724,621 | 4/1973 | Heidorn | 192/84 C X |
| 3,831,723 | 8/1974 | Briar et al. | 192/84 T X |
| 3,865,222 | 2/1975 | Briar | 192/84 T X |
| 4,030,584 | 6/1977 | Lowery et al. | 192/84 T |

Primary Examiner—Rodney H. Bonck
Attorney, Agent, or Firm—Hopgood, Calimafde, Kalil, Blaustein & Lieberman

[57] ABSTRACT

An electromagnetic clutch wherein a rotational force is transmitted between a first rotatable member and a second rotatable member by a magnetic attraction of an armature supported on one of the first and second rotatable members to the other member. The armature is rotatable with respect to the member upon which it is mounted within a limited extent. At least one arcuate spring member is provided to connect the armature and the supporting member. The inner surface of the arcuate member faces the annular surface of a portion of the other rotatable member. When the armature is magnetically attracted to, and rotated together with, the other rotatable member, the inner surface of the arcuate spring member comes into contact with an annular surface of the other rotatable member so that the transmission of the rotational force is effected through the arcuate spring in addition to the magentic attraction of the armature.

7 Claims, 6 Drawing Figures

ELECTROMAGNETIC CLUTCHES

BACKGROUND OF THE INVENTION

This invention relates to electromagnetic clutches and, in particular, to such clutches which are adaptable, for use in controlling the transmission of an automobile engine output to refrigerant compressors for automobile air conditioning refrigerating systems.

In U.S. Pat. Nos. 3,044,594 and 3,082,933, electromagnetic clutches are disclosed which are used between the engine and the compressor for selectively driving the compressor. The shown electromagnetic clutch comprises a pulley which is mounted on a bearing mounted on a tubular extension of a compressor housing and which is rotated by a belt from the automobile's engine. The pulley is provided with a plurality of concentric annular magnetic pole faces at an axial end thereof. A drive shaft of the compressor extends through the tubular extension. A hub is fixed to the extending terminal end of the drive shaft, and an annular armature plate is joined by leaf springs to the hub in such fashion that the armature plate faces the annular concentric pole faces with space therebetween. A magnetic coil is mounted on the tubular extension to supply magnetic flux for attracting the armature plate to the magnetic pole faces.

Thus, when the magnetic coil is energized, the drive shaft is rotated together with the pulley by the engine output, and when the magnetic coil is not energized, the pulley is rotated by the engine but the compressor is not driven.

In the above described known clutches, the transmission of the rotating force from the pulley to the shaft is effected by the friction at the contacting surface between the pulley and the armature plate. Therefore, it is required that the contacting friction between the pulley and the armature be quite large. This requires a larger coil, greater electrical energy, an increase of poles of the pulley and the armature plate, and/or the use of complicated structures in the contacting surfaces of the pulley and armature.

SUMMARY OF THE INVENTION

Therefore, a specific object of this invention is to provide an electromagnetic clutch assembly for an automobile compressor, wherein the transmission of the rotating force is securely effected with a simple and compact structure, with low cost and with a reduced use of electrical energy.

Another general object of this invention is to provide an electromagnetic clutch which is capable of securely transmitting rotating force, with a simple and compact structure, with low cost, and with a reduced use of electrical energy.

Briefly stated, this invention relates to an electromagnetic clutch which comprises a clutch element provided to a rotating member, another cooperating clutch element provided to another rotatable member, and electromagnetic means associated with one of both clutch elements for magnetically attracting the other clutch element. This arrangement provides for establishing frictional contact other than the frictional contact between both clutch elements, to transmit the rotational force from the rotating member to the other rotatable member when both clutch elements are magnetically attracted to one another.

An electromagnetic clutch according to this invention comprises a first rotatable member having axial annular magnetic attraction pole pieces, and a second rotatable member having a magnetic armature plate facing the axial magnetic attraction pole pieces with an axial gap therebetween. The armature plate is supported on the second rotatable member and is capable of a limited axial movement and capable of rotation relative to the second rotatable member. Electromagnetic means are associated with one of the magnetic attraction pole pieces and the magnetic armature to attracting the other. The first rotatable member is provided with an axial projection on an axial end thereof to define an annular surface with a smaller diameter than the annular magnetic attraction pole pieces. One or more arcuate spring members are so disposed that the inner surface thereof face the annular peripheral surface of the projection, with opposite ends of the spring member being engaged with the second rotatable member and the armature plate, respectively. Therefore, when the armature plate is attracted to the magnetic attraction pole pieces by means of the electromagnetic means, the armature plate rotates together with the first rotatable member which is being driven by any peripheral driver. As a result, the inner surface of each arcuate spring member comes into tight contact with the annular peripheral surface of the projection of the first rotatable member, so that the second rotatable member rotates together with the first rotatable member. Since the transmission of the rotational force is effected through the tight contact between the inner surface of each arcuate member and the annular peripheral surface of the projection, in addition to a magnetic frictional contact between the magnetic pole pieces and the armature, it is not necessary that the contacting friction between the magnetic pole pieces and the armature plate be large.

In an aspect of this invention, the second rotatable member is provided with a flange or a hub to which a stopper plate is secured with an axial gap. An annular spring plate having radially outwardly extending fingers is disposed in the axial gap between the flange and the stopper plate. The armature plate is fixed to extending ends of the fingers, so that the armature plate is rotatable together with the spring plate in relation to the second rotatable member. The armature plate is also axially movable within a limited extent because of the flexibility of the spring plate.

An arcuate or C-shaped spring member is disposed surrounding the axial projection of the first rotatable member. Both ends of the C-shaped spring member are provided with radially outwardly extending projections which are disposed in cut-off portions of the armature plate and the flange of the second rotatable member. Accordingly, when the armature rotates relative to the second rotatable member, one of the projections of the C-shaped spring member engages the armature plate and the other engages the flange of the second rotatable member so that the second rotatable member is drawn to the armature plate. At this time, the C-shaped spring member is deformed so as to come into tight contact with the axial projection of the first rotatable member.

The C-shaped spring member may be secured at opposite ends to the armature and the flange of the second rotatable member, by means of, rivets or other means.

In another aspect of this invention, the armature plate is supported and connected to the flange of the second rotatable member by a plurality of arcuate spring members so as to be capable of limited axial elastic movement. The inner surface of each arcuate spring member faces the peripheral surface of the axial projection of the first rotatable member.

The arcuate spring member may be of steel or other rigid elastic materials.

Further objects, features and other aspects of this invention will be understood from the following description in connection with preferred embodiments of this invention referring to the annexed drawings.

DETAILED DESCRIPTION OF PREFERRED EMBODIMENTS

Figure 1:
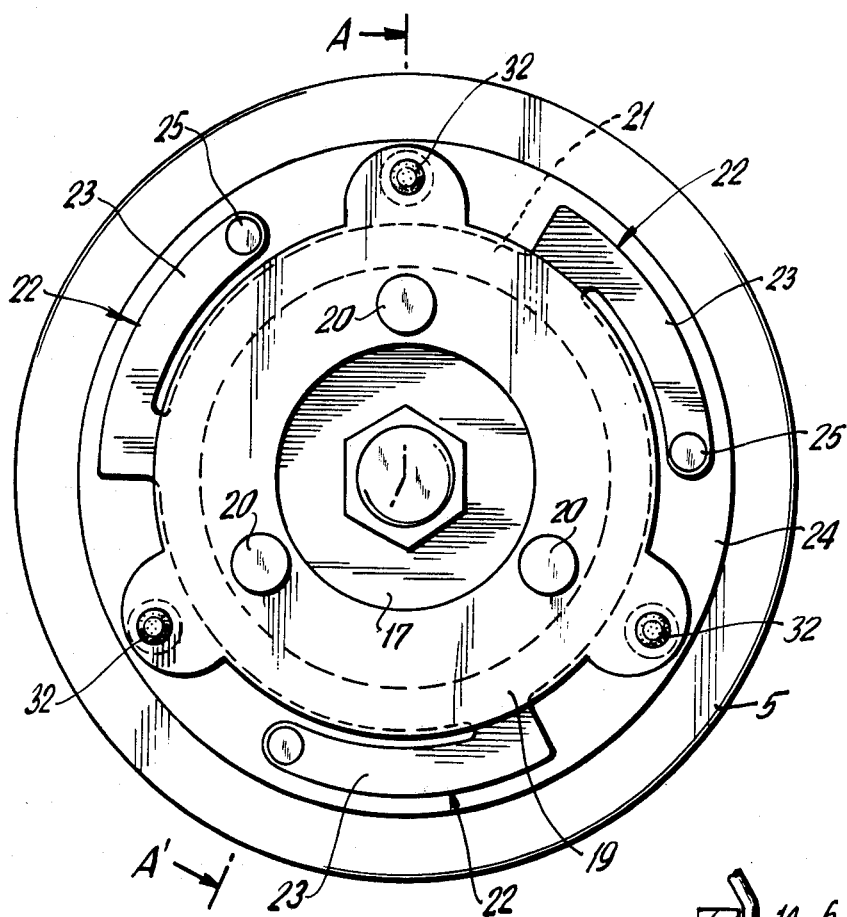
FIG. 1 shows a front view of an embodiment of this invention wherein this invention is applied to an electromagnetic clutch for transmitting a rotating force to a compressor drive shaft.

Referring to FIGS. 1-4 which show an embodiment of this invention, the clutch is assembled on an automobile compressor for an automotive air conditioning and refrigerating system. The compressor housing 1 is provided with a cantilevered tubular extension 2 surrounding an extension 3 of the drive shaft of the compressor, which shaft is rotatably supported in the compressor housing wall by a bearing.

Ball bearings 4 are mounted on the tubular extension 2, and a pulley 5 is mounted on the bearings 4.

The pulley 5 is of a magnetic materials, for example, of steel and comprises an outer annular cylindrical portion 6, an inner annular cylindrical portion 7 and an axial end plate portion 8 connecting between the outer and inner cylindrical portions at an axial forward end.

On the outer peripheral surface of the outer cylindrical portion 6, an annular V-shaped groove 9 is provided for receiving a V-belt for coupling to an output shaft of an automobile engine (not shown).

The axial end plate portion 8 include one or more concentric slits 10 so that a plurality of annular or arcuate magnetic pole pieces are defined, with the pole piece surfaces being on the axial end surface 11 of the axial end plate portion 8.

An electromagnetic annular coil 12 is disposed in an annular space 13 defined by the inner and outer cylindrical portions 6 and 7 and the axial end plate portion 8.

The coil 12 is contained within an annular magnetic housing 14 having a U-shaped cross section. The housing 14 is fixed to a supporting plate 15 which is secured to the compressor housing 1, so that the coil housing 14 is maintained within a space 13 out of contact with the pulley 5 but with a small gap.

The pulley 5 is provided with an annular axial projection 16 defining an annular peripheral surface at the radial inner end of the axial end plate portion 8.

The shaft extension 3 has a hub or flange 17 which is secured to an extending terminal end of the shaft extension. The hub 17 is provided with an annular step portion 18 on the outer surface. An annular stopper plate 19 is so fixed to the hub 17 by means of, for example, rivets 20 that an annular gap is formed between the step portion 18 and the stopper plate 19. In the annular gap, an annular spring plate 21 is disposed, which has a plurality of radially outwardly extending fingers 22 (three fingers are shown in FIG. 1).

Each finger is provided with a bent portion 23 which extends concentrically with the hub 17. At the ends of the bent portions 23, a magnetic annular plate, or an armature 24 is fixed by rivets 25 or other means. The armature 24 faces the axial end surface 11 of the pulley 5 with an narrow axial gap. The inner diameter of the armature 24 is greater than the outer diameter of the hub 17.

The hub 17 is provided with an axial annular projection 26 with an inner diameter greater than the outer diameter of the annular projection 16 of the pulley 5. The annular projections 16 and 26 are axially overlapped to define an annular space therebetween, in which a C-shaped spring member 27 is disposed.

Figure 3:
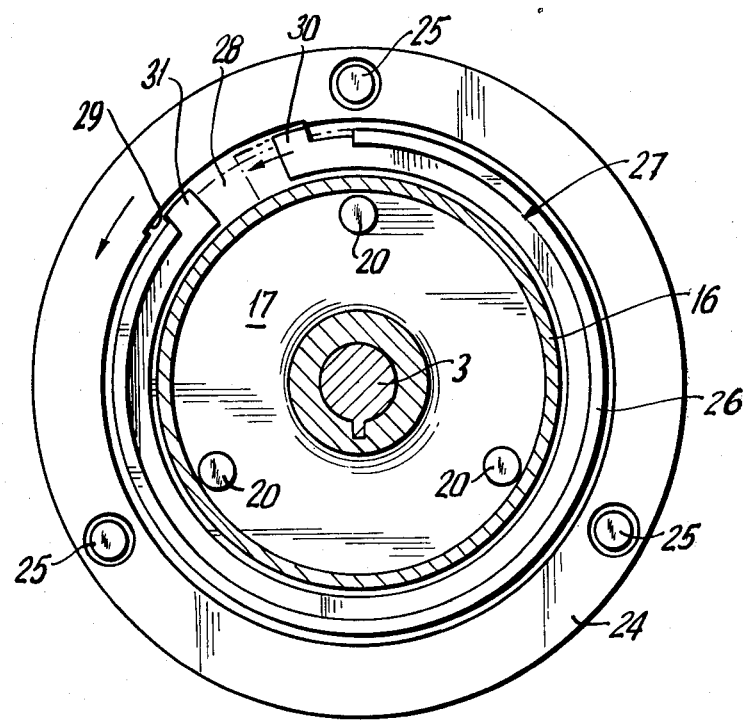
FIG. 3 shows a sectional view along a line B—B' in FIG. 2.

The annular projection 26 of the hub 17 is partially cut off at 28 (FIG. 3). The armature 24 is also provided with a cut-off portion 29 at the radial inner edge thereof which corresponds to the cut-off portion 28 of the annular projection 26.

Figure 4:
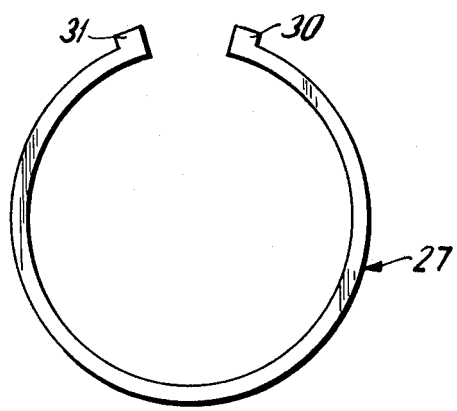
FIG. 4 shows a front view of a C-shaped spring member which is used in the embodiment.

As shown in FIG. 4, the C-shaped spring member 27 is provided with radially projections 30 and 31, which are disposed in the cut-off portion 28 and in the cut-off portion 29.

Three elastic members or gum stoppers 32 (shown in FIGS. 1 and 2) are for providing an initial deformation to, or biasing, the spring plate 21 to define an axial air gap between the axial end surface 11 and the inner surface of the armature plate 24.

Figure 2:
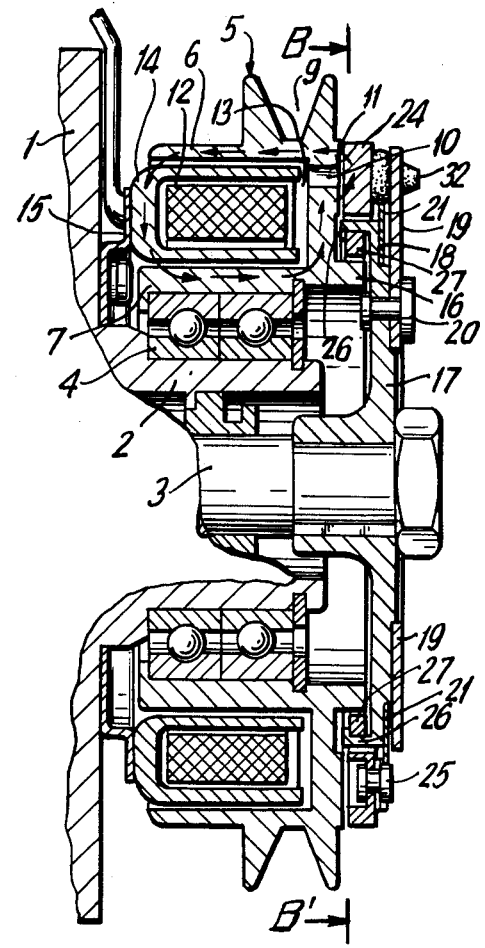
FIG. 2 shows a sectional view along a line A—A' in FIG. 1.

In operation, when the coil 12 is energized, the developed magnetic flux flows in a closed magnetic loop comprising the coil housing 14, the inner cylindrical portion 7 of the pulley, the axial end wall portion 8, the armature plate 24, and the outer cylindrical portion 6, as shown by the arrows in FIG. 2. Namely, the magnetic poles formed in the axial end plate 8 by slits 10 thereof attract the armature 24 against the elastic force of the fingers 22 of the spring plate 21. Thus, the inner surface of the armature plate 24 comes into contact with the axial end surface 11 of the pulley 5.

If the pulley 5 is rotated, the armature plate 24 the spring plate 21 rotate together with the pulley 5 due to the contacting friction between the surface 11 and the armature plate 24. It should be noted that the shaft 3 and the hub 17 are not rotated at that time, because the spring plate 21 is rotatable with respect to hub 17.

As spring plate 21 and pulley 5 rotate projection 30 will engage an edge of the cut-off portion 29 or the projection 31 will engage an edge of the cut-off portion 28 of the hub 17. Accordingly, the C-shaped spring member 27 is so deformed that the inner diameter of the member 27 reduces. As a result, the inner surface of the spring member 27 comes into tight contact with the peripheral surface of the annular projection 16 of the pulley 5. Then, rotation of the armature plate 24 relative to the hub and the shaft is prevented, and therefor, the hub 17 and the shaft 3 are rotated together with the armature plate 24 due to the transmission of the rotating force from the pulley 5 to the hub 17 through the frictional contact between the pulley 5 and the armature 24 and between the annular projection 16 of the pulley 5 and the C-shaped member 27.

When the energization of the coil 12 is removed the armature plate 24 moves away from the pulley 5 by the elasticity of the spring plate 21. Accordingly, the C-shaped spring member 27 recovers its original form to be free from contact with the annular projection 16 of the pulley 5. As a result, the transmission of the rotational force from the pulley to the hub is broken off, so that the rotation of the shaft 3 stops.

According to this embodiment, the transmission of the rotational force is securely effected by the addition of only one part, the C-shaped spring member. The longest frictional force is developed between the pulley and the C-shaped spring member at a time when the operation of the compressor starts, so that slip of the clutch is prevented.

The C-shaped spring member may be secured by means of, for example, rivets to the armature plate and the hub, respectively.

Furthermore, instead of a single C-shaped spring a plurality of arcuate spring members may be employed.

Figure 5:
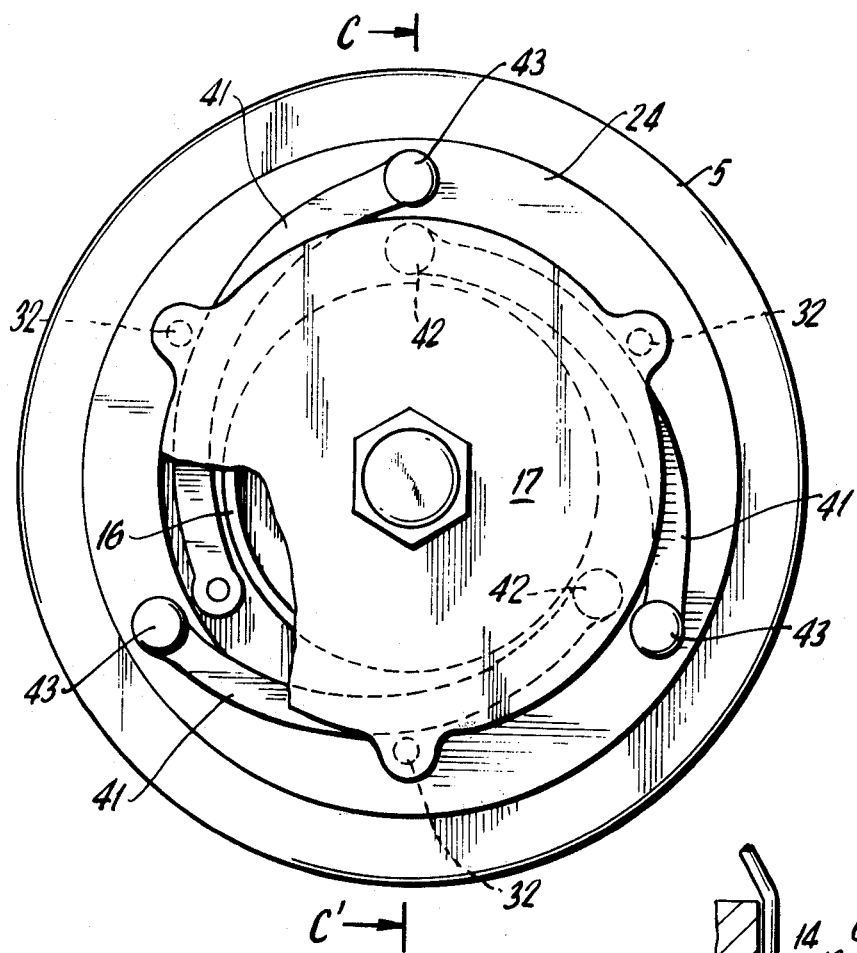
FIG. 5 shows a front view of another embodiment of this invention.
Figure 6:
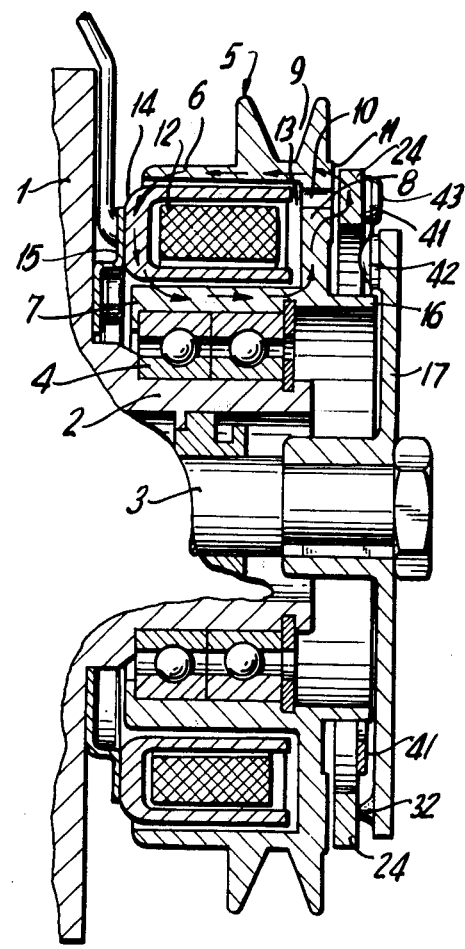
FIG. 6 shows a sectional view along a line C—C' in FIG. 5.

Referring to FIGS. 5 and 6, another embodiment of this invention is characterized in that a plurality of arcuate leaf springs 41 are used for supporting the armature plate 24 as well as for establishing a tight contact with the pulley 5. Similar parts are indicated by the use of the same reference numerals as the embodiment shown in FIGS. 1-4.

One end of each arcuate spring member 41 is secured to the axial inner surface of the hub 17 by means of a rivet 42, and the other end is secured to the axial outer surface of the annular armature plate 24 by means of a rivet 43.

The annular axial projection 16 of the pulley 5 extends to axially overlap with the arcuate leaf springs 41, with the radial inner surface of each arcuate leaf spring facing the peripheral surface of the projection 16.

The inner diameter of each arcuate leaf spring 41 is greater than the diameter of the peripheral surface of the projection 16.

It should be noted that the armature 24 is capable of limited axial and rotational movement relative to the hub 17 under application of force sufficient to overcome the flexibility of the leaf springs.

When the pulley 5 is driven through a V-belt from an engine, if the coil 12 is energized, the armature plate 24 is magnetically attracted to the axial end surface 11 of the pulley 5, similar to the embodiment of FIGS. 1-4. Then, the armature plate 24 is subjected to a rotational force from the pulley 5. Accordingly, the arcuate leaf springs 41 are so deformed that their radial inner diameter reduces. As a result, the radial inner surface of each leaf spring 41 comes into contact with the peripheral surface of the projection 16 of the pulley 5. Therefore, the hub 17 and, thus, the drive shaft 3 of the compressor are rotated, due to the transmission of the rotational force through the contact between the armature plate 24 and the pulley 5 and between the leaf springs 41 and the annular projection 16 of the pulley 5.

When the energization of the coil 12 is removed, the armature plate 24 pulls away from the pulley 5 by the elastic force of the leaf springs 41, and, therefore, the contact between each leaf spring 41 and the annular projection 16 of the pulley 5 is also released. Therefore, no rotational force is transmitted to the hub 17 and the shaft 3.

In the embodiment in FIGS. 5 and 6, parts for supporting the armature plate and for establishing a tight contact with the annular projection of the pulley are common and, therefore, the structure is simpler in comparison with the embodiment shown in FIGS. 1-4.

According to this invention, the transmission of the rotational force is effected through a contact between the radial inner surface of the arcuate spring member and the peripheral surface of the axial projection of the pulley, in addition to the contact between the armature and the pulley, so that the hub and the shaft of the compressor is rotated without any slip. Furthermore the structure of the clutch is not complicated and is, therefore, low in the cost.

It should be noted that the axial annular projection of the pulley need not be continuous but may be non-continuous with a plurality of angular positions.

This invention has been described in relation to its application to compressor for automotive air conditioning and refrigerating systems. But it will be noted that this invention may be similarly applied to any other electromagnetic clutches.

This invention has been described in detail in connection with preferred embodiments, but these are merely for exemplification and this invention is not restricted thereto. It will be easily understood by those skilled in the art that the other various designations and various modifications can be easily made within the scope of this invention.

What is claimed:

1. In an electromagnetic clutch comprising a first rotatable member rotatably supported on a bearing means and having an axial end surface thereof, said first rotatable member being provided with an annular first clutch element of magnetic material having axial end magnetic friction surfaces, a second rotatable member rotatably supported on another bearing means and having a flange which faces said axial end surface with an axial gap therebetween, a cooperating annular second clutch element of magnetic material being supported on said flange of said second rotatable member so as to be capable of limited axial movement and having an axial end surface which faces said magnetic friction surfaces of said annular first clutch element with an axial gap therebetween, and electromagnetic means associated with one of said annular first and second clutch elements for attracting the other clutch element, the improvement comprising said second annular clutch element being relatively rotatable on said second rotatable member, said first rotatable member being provided with an axial projection on said axial end surface thereof to define an annular surface with a smaller diameter than said first annular clutch element, said flange being provided with an axial annular projection on the axial end surface thereof which faces said axial projection of said first rotatable member, said annular projection having a greater inner diameter than the diameter of the annular surface defined by said axial projection of said first rotatable member and being partially cut away, said second clutch element being partially cut away at the radial inner edge thereof, at least one C-shaped spring member having a greater inner diameter than said annular surface of said projection and having radially outwardly extending projections at opposite ends thereof, said C-shaped spring being disposed within an annular space between said annular axial projection of said flange and said axial projection of said first rotatable member with said radially outwardly extending projections being disposed in said cut away portion of said annular axial projection and said cut away portion of said second clutch element so that one of said projections of said arcuate spring member engages with said second clutch element, with the other projection engaging with said flange when second clutch element is rotated, whereby the transmission of the rotational force from said first rotatable member to said second rotatable member may be secured by a frictional contact between said annular surface of said projection and the inner surface of said C-shaped spring member established by the rotation of said second clutch element together with said first clutch element attracted thereto, in addition to the frictional contact between said first and second clutch elements.

2. The improvement as claimed in claim 1, in which said flange of said second rotatable member is provided with an annular step, a flexible annular spring plate having a plurality of radially extending finger means, said spring plate being fitted to said annular step and being rotatably supported on said flange, stopper plate means being fixed to said flange to prevent said spring plate from becoming disengaged from the support of said flange, and said second clutch element being an annular magnetic armature plate which is fixed to extending ends of said finger means of said spring plate, whereby said annular armature plate may be rotatable relative to said flange and may be axially movable within a limited extent due to the flexibility of said spring plate.

3. The improvement as claimed in claim 1, wherein said first rotatable member is a pulley of magnetic material which is rotatably mounted on a tubular extension from a compressor housing surrounding a compressor drive shaft extension, said second rotatable member being the compressor drive shaft extension which is rotatably born in the compressor housing.

4. The improvement as claimed in claim 3, wherein said pulley comprises an outer cylindrical body provided with a V-shaped groove on the outer surface thereof, an inner cylindrical body, and an axial end plate connecting between said outer and inner cylindrical bodies, said electromagnetic means being supported on said tubular extension and being disposed in an annular space defined by said outer and inner cylindrical bodies and said axial end plate, with a gap therebetween.

5. In an electromagnetic clutch comprising a first rotatable member rotatably supported on a bearing means and having an axial end surface thereof, said first rotatable member being provided with an annular first clutch element of magnetic material having axial end magnetic friction surfaces, a second rotatable member rotatably supported on another bearing means and having a flange which faces said axial end surface with an axial gap therebetween, a cooperating annular second clutch element of magnetic material being supported on said flange of said second rotatable member so as to be capable of limited axial movement and having an axial end surface which faces said magnetic friction surfaces of said annular first clutch element with an axial gap therebetween, and electromagnetic means associated with one of said annular first and second clutch elements for attracting the other clutch element, the improvement comprising said second annular clutch element being relatively rotatable on said second rotatable member, said first rotatable member being provided with an axial projection on said axial end surface thereof to define an annular surface with a smaller diameter than said first annular clutch element, a plurality of arcuate spring members each having a greater inner diameter than said annular surface of said projection, one end of each arcuate member being secured with said second clutch element and the other end being secured with said flange of said second rotatable member to support said second clutch element axially movably and rotatably within a limited extent due to the flexibility of said arcuate spring members, each arcuate member being so disposed that the inner surface thereof faces said annular surface of said projection, whereby the transmission of the rotational force from said first rotatable member to said second rotatable member may be secured by a frictional contact between said annular surface of said projection and the inner surfaces of said arcuate members established by the rotation of said second clutch element together with said first clutch element attracted thereto, in addition to the frictional contact between said first and second clutch elements.

6. The improvement as claimed in claim 5, wherein said first rotatable member is a pulley of magnetic material which is rotatably mounted on a tubular extension from a compressor housing surrounding a compressor drive shaft extension which is rotatably born in the compressor housing.

7. The improvement as claimed in claim 6, wherein said pulley comprises an outer cylindrical body provided with a V-shaped groove on the outer surface thereof, an inner cylindrical body, and an axial end plate connecting between said outer and inner cylindrical bodies, said electromagnetic means being supported on said tubular extension and being disposed in an annular space defined by said outer and inner cylindrical bodies and said axial end plate, with a gap therebetween.

* * * * *

UNITED STATES PATENT AND TRADEMARK OFFICE
CERTIFICATE OF CORRECTION

PATENT NO. : 4,243,128
DATED : January 6, 1981
INVENTOR(S) : Isamu Shirai

It is certified that error appears in the above-identified patent and that said Letters Patent are hereby corrected as shown below:

On the first page of the patent, Assignee is shown as

"Assignee: Sankyo Electronic Company Limited, Isesaki, Japan";

it should read:

--Assignee: Sankyo Electric Company, Limited, Isesaki, Japan--

Signed and Sealed this

Twenty-eighth Day of April 1981

[SEAL]

Attest:

RENE D. TEGTMEYER

Attesting Officer     Acting Commissioner of Patents and Trademarks